United States Patent
Laine et al.

(10) Patent No.: US 9,269,183 B1
(45) Date of Patent: Feb. 23, 2016

(54) COMBINED CLIPLESS TIME AND LENS BOUNDS FOR IMPROVED SAMPLE TEST EFFICIENCY IN IMAGE RENDERING

(75) Inventors: Samuli Laine, Helsinki (FI); Tero Karras, Helsinki (FI)

(73) Assignee: NVIDIA CORPORATION, Santa Clara, CA (US)

( * ) Notice: Subject to any disclaimer, the term of this patent is extended or adjusted under 35 U.S.C. 154(b) by 248 days.

(21) Appl. No.: 13/248,128

(22) Filed: Sep. 29, 2011

Related U.S. Application Data (60) Provisional application No. 61/513,622, filed on Jul. 31, 2011.

(51) Int. Cl.
*G09G 5/00* (2006.01)
*G06T 15/50* (2011.01)
*G06T 13/20* (2011.01)

(52) U.S. Cl.
CPC .............. *G06T 15/503* (2013.01); *G06T 13/20* (2013.01); *G06T 15/50* (2013.01)

(58) Field of Classification Search
USPC .................. 345/611–614, 620; 382/266, 269
See application file for complete search history.

(56) References Cited

U.S. PATENT DOCUMENTS

| | | |
|---|---|---|
| 4,897,806 A | 1/1990 | Cook et al. |
| 5,113,493 A | 5/1992 | Crosby |
| 5,222,203 A | 6/1993 | Obata |
| 5,239,624 A | 8/1993 | Cook et al. |
| 5,289,565 A | 2/1994 | Smith et al. |
| 5,299,298 A | 3/1994 | Elmquist et al. |
| 5,357,579 A | 10/1994 | Buchner et al. |
| 5,384,667 A | 1/1995 | Beckwith |
| 5,402,534 A | 3/1995 | Yeomans |
| 5,465,119 A | 11/1995 | Demos |
| 5,684,935 A | 11/1997 | Demesa, III et al. |
| 5,729,672 A | 3/1998 | Ashton |
| 5,737,027 A | 4/1998 | Demos |
| 5,809,219 A | 9/1998 | Pearce et al. |
| 5,870,096 A | 2/1999 | Anjyo et al. |
| 5,973,700 A | 10/1999 | Taylor et al. |
| 5,982,385 A | 11/1999 | Fish et al. |

(Continued)

FOREIGN PATENT DOCUMENTS

| | | |
|---|---|---|
| CN | 1856805 | 11/2006 |
| CN | 101599181 | 12/2009 |
| WO | 2012115711 A2 | 8/2012 |

OTHER PUBLICATIONS

P. Haberli and K. Akeley, "The Accumulation Buffer: Hardware Support for High Quality Rendering," In Proc. SIGGRAPH 1990. pp. 309-318.

(Continued)

*Primary Examiner* — Xiao Wu
*Assistant Examiner* — Steven Elbinger (57) ABSTRACT

A method for reducing the number of samples tested for rendering a screen space region of an image includes constructing a bilinear approximation per primitive for a screen space region which is to be rendered, wherein the screen space region includes a plurality of sample points. The bilinear approximation is used to estimate coverage of a predefined primitive against one or more sample points within the screen space region. At least one sample point in the screen space region which is not covered by the predefined primitive is excluded from testing in the rendering of the screen space region.

27 Claims, 5 Drawing Sheets

(56) References Cited

U.S. PATENT DOCUMENTS

| | | | |
|---|---|---|---|
| 6,034,667 A | 3/2000 | Barrett | |
| 6,211,882 B1 | 4/2001 | Pearce et al. | |
| 6,300,956 B1 | 10/2001 | Apodaca et al. | |
| 6,618,048 B1 | 9/2003 | Leather | |
| 6,636,214 B1 | 10/2003 | Leather et al. | |
| 6,700,586 B1 | 3/2004 | Demers | |
| 6,707,458 B1 | 3/2004 | Leather et al. | |
| 6,717,577 B1 | 4/2004 | Cheng et al. | |
| 6,720,975 B1* | 4/2004 | Dietrich, Jr. | 345/611 |
| 6,811,489 B1 | 11/2004 | Shimizu et al. | |
| 6,867,781 B1 | 3/2005 | Van Hook et al. | |
| 6,885,384 B2 | 4/2005 | Deering et al. | |
| 6,999,100 B1 | 2/2006 | Leather et al. | |
| 7,002,591 B1 | 2/2006 | Leather et al. | |
| 7,034,828 B1 | 4/2006 | Drebin et al. | |
| 7,050,066 B2 | 5/2006 | Ohta | |
| 7,061,502 B1 | 6/2006 | Law et al. | |
| 7,075,545 B2 | 7/2006 | Van Hook et al. | |
| 7,119,813 B1 | 10/2006 | Hollis et al. | |
| 7,133,041 B2* | 11/2006 | Kaufman et al. | 345/419 |
| 7,133,047 B2 | 11/2006 | Pallister | |
| 7,136,081 B2 | 11/2006 | Gritz et al. | |
| 7,176,919 B2 | 2/2007 | Drebin et al. | |
| 7,184,059 B1 | 2/2007 | Fouladi et al. | |
| 7,187,379 B2 | 3/2007 | Keller | |
| 7,196,710 B1 | 3/2007 | Fouladi et al. | |
| 7,205,999 B2 | 4/2007 | Leather | |
| 7,230,618 B2 | 6/2007 | Keller | |
| 7,307,638 B2 | 12/2007 | Leather et al. | |
| 7,307,640 B2 | 12/2007 | Demers et al. | |
| 7,317,459 B2 | 1/2008 | Fouladi et al. | |
| 7,362,332 B2 | 4/2008 | Gritz | |
| 7,446,780 B1* | 11/2008 | Everitt et al. | 345/611 |
| 7,453,460 B2 | 11/2008 | Keller | |
| 7,453,461 B2 | 11/2008 | Keller | |
| 7,477,261 B2 | 1/2009 | Pallister | |
| 7,483,010 B2 | 1/2009 | Bai et al. | |
| 7,499,054 B2 | 3/2009 | Keller | |
| 7,538,772 B1 | 5/2009 | Fouladi et al. | |
| 7,576,748 B2 | 8/2009 | Van Hook et al. | |
| 7,616,200 B1 | 11/2009 | Heinrich et al. | |
| 7,623,726 B1 | 11/2009 | Georgiev | |
| 7,697,010 B2 | 4/2010 | Pallister | |
| 7,701,461 B2 | 4/2010 | Fouladi et al. | |
| 7,742,060 B2 | 6/2010 | Maillot | |
| 7,961,970 B1 | 6/2011 | Georgiev | |
| 7,973,789 B2 | 7/2011 | Cook | |
| 7,995,069 B2 | 8/2011 | Van Hook et al. | |
| 8,098,255 B2 | 1/2012 | Fouladi et al. | |
| 8,970,584 B1 | 3/2015 | Aila et al. | |
| 2003/0083850 A1 | 5/2003 | Schmidt et al. | |
| 2006/0101242 A1 | 5/2006 | Siu et al. | |
| 2007/0046686 A1 | 3/2007 | Keller | |
| 2008/0001961 A1 | 1/2008 | Roimela et al. | |
| 2008/0244241 A1 | 10/2008 | Barraclough et al. | |
| 2009/0167763 A1 | 7/2009 | Waechter et al. | |
| 2011/0090337 A1* | 4/2011 | Klomp et al. | 348/144 |
| 2012/0218264 A1 | 8/2012 | Clarberg et al. | |
| 2012/0293515 A1 | 11/2012 | Clarberg et al. | |
| 2012/0327071 A1 | 12/2012 | Laine et al. | |
| 2013/0321420 A1 | 12/2013 | Laine et al. | |

OTHER PUBLICATIONS

Tomas Akenine-Möller, Jacob Munkberg, and Jon Hasselgren, "Stochastic rasterization using time-continuous triangles," Proc. Graphics Hardware 2009.

Kayvon Fatahalian, Edward Luong, Solomon Boulos, Kurt Akeley, William R. Mark, and Pat Hanrahan, "Data-Parallel Rasterization of Micropolygons with Defocus and Motion Blur," Proc. High Performance Graphics 2009.

Laine, S., et al., "Clipless Dual-Space Bounds for Faster Stochastic Rasterization," ACM Transactions on Graphics (TOG), vol. 30, Issue 4, Article 106, Jul. 2011, pp. 1-6.

Hou, Q., et al., "Micropolygon Ray Tracing with Defocus and Motion Blur," ACM Transactions on Graphics (TOG), vol. 29, Article 64, Jul. 2010, pp. 1-10.

Wang, Liqing; "Research on Algorithms of Computational Geometry in GIS"; China Master's Theses Full Text Database; Jan. 31, 2009.

Moller., et al., "Stochastic Rasterization Using Time-Continuous Triangles," ACM, Jan. 2007, pp. 1-11.

McGuire, et al; "Hardware-Accelerated Global Illumination by Image Space Photon Mapping", HPG 2009, New Orleans, Louisiana, Aug. 1-3, 2009.

Linsen, et al; "Splat-based Ray Tracing of Point Clouds", Journal of WSCG 15: 51-58, 2007.

Schaufler, et al; "Ray Tracing Point Sampled Geometry", In Proceedings of the Eurographics Workshop on Rendering Techniques 2000, pp. 319-328, London, UK, 2000. Springer-Verlag.

* cited by examiner

COMBINED CLIPLESS TIME AND LENS BOUNDS FOR IMPROVED SAMPLE TEST EFFICIENCY IN IMAGE RENDERING

CROSS REFERENCE TO RELATED APPLICATIONS

The Application claims the benefit of priority of U.S. provisional application 61/513,622 filed Jul. 31, 2011, the contents of which are herein incorporated by reference.

This application is also related to and incorporates by reference each of the following commonly-owned US patent applications:

Patent application Ser. No. 13/168,765 entitled "System and Method for Improved Sample Test Efficiency in Image Rendering," filed Jun. 24, 2011;

Patent application Ser. No. 13/168,771 entitled "Bounding Box-Based Techniques for Improved Sample Test Efficiency in Image Rendering," filed Jun. 24, 2011;

Patent application Ser. No. 13/168,773 entitled "Bounding Plane-Based Techniques for Improved Sample Test Efficiency in Image Rendering," filed Jun. 24, 2011; and Patent application Ser. No. 13/168,784 entitled "Clipless Time and Lens Bounds for Improved Sample Test Efficiency in Image Rendering," filed Jun. 24, 2011.

COPYRIGHT NOTICE

A portion of the disclosure of this patent document contains material which is subject to copyright protection. The copyright owner has not objection to the facsimile reproduction by anyone of the patent document of the patent disclosure, as it appears in the Patent and Trademark Office patent file or records, but otherwise reserves all copyright rights whatsoever.

BACKGROUND

The present invention relates to image rendering, and more particularly to improving sample test efficiency in image rendering applications.

The rendering of a high quality image relies upon an accurate color computation for each pixel forming the image. The accuracy of this color computation is improved by distributing sample points across each pixel, testing which sample points are overlapped by a primitive which is to be rendered in the image, and computing a color for the pixel based upon those overlapped and non-overlapped sample points.

Sample testing algorithms (sometimes referred to as "point in polygon tests") determine which samples of a screen space region (usually a pixel) are overlapped by a primitive, and the quality of such algorithms can be based upon their "sample test efficiency" (STE), this term referring to the number of sample points overlapped by a primitive versus the number of sample points tested for a given screen space region, e.g. a pixel. A high STE indicates an efficient sample testing algorithm, as a high percentage of the test sample points were actually or possibly overlapped by the primitive.

Techniques for improving STE are useful in the contexts of motion blur and depth of field rendering effects, as both types of effects involve a primitive potentially traversing a large number of pixels, resulting in a potentially large number of sample points which have to be considered for testing.

Motion blur results when the camera and/or geometry move while the virtual camera shutter is open. While the motion can theoretically be arbitrary during the exposure of a frame, it has been observed in film industry that vertex motion can often be satisfactorily simplified by assuming linear motion between shutter open (t=0) and closed (t=1).

In stochastic rasterization, the frame buffer is generalized so that each sample has additional properties in addition to the screen-space (x, y) position. In order to support motion blur, a time value is assigned to each frame buffer sample. In absence of motion, the frame buffer behaves exactly as it does currently, providing spatial antialiasing. With motion, a sample is updated only when a triangle overlaps the sample at the time of the sample.

The prior art describes several ways of interpolating a triangle to a specified time. One approach is as described in "The Accumulation Buffer: Hardware Support for High Quality Rendering," P. Haberli and K. Akeley, Proc. SIGGRAPH 1990, pgs. 309-318, and in "Data-Parallel Rasterization of Micropolygons with Defocus and Motion Blur," K. Fatahalian, E. Luong, S. Boulos, K. Akeley, W. Mark, and P. Hanrahan, Proc. High Performance Graphics 2009. This approach involves interpolating the vertices of a primitive in homogeneous clip space before triangle setup, and therefore a separate triangle setup/rendering pass is required for each distinct time. While simple to implement, this approach may not scale to a large number of samples per pixel, and the image quality can suffer due to a fixed (typically small) set of unique time values.

A second conventional approach has been to identify the screen-space bounds for the "time-continuous triangle" (TCT) for the entire exposure time, and then test all samples in all covered pixels by interpolating the triangle to the current sample's time, as described in disclosed in "Stochastic rasterization using time-continuous triangles," T. Akenine-Möller, J. Munkberg, and J. Hasselgren, Proc. Graphics Hardware 2009. Possible implementations include at least time-continuous edge functions (about 3× the cost of traditional 2D edges) and ray-triangle intersection. TCTs offer high image quality because a unique time value can be set to each sample, but an accompanying disadvantage is low STE. When a triangle moves quickly, it can cover a relatively large region on the screen, yet at the same time we expect it to cover approximately a constant number of samples regardless of motion. STE therefore degrades drastically for fast motion, and can be as low as 1% in realistic cases.

A third approach is described in U.S. Pat. No. 4,897,806, whereby exposure time is split into several strata (typically, the number of strata equals the number of samples per pixel), and the above-mentioned second approach is called for each strata. This improves STE significantly, but the efficiency of the solution is not optimal for the low sampling densities typically encountered in fast rendering graphics (4-16 samples/pixel).

Another challenge in the rendering of images is how to process primitives which reach behind the camera plane. A possible approach for dealing with such primitives is to clip the primitive in time, producing a number of sub-spans where clipping edges are replaced by clip vertices that move across the camera plane. Unfortunately, the motion of the clip vertices is not screen-space affine, so an approximation is required for their motion, which makes it difficult if not impossible to match a reference rendering.

An additional challenge in the rendering of images is the rendering of vertices which move affinely in world space. When the vertices move affinely in world space, which is a common approximation, the resulting screen-space motion is not linear because of perspective transformation. Therefore, if linear screen-space motion was assumed, the motion-blurred image would not correspond to ground truth rendering that would be obtained by summing together a large number of images obtained at regularly spaced time instants during the frame. The difference is usually small, but when there is motion towards or away from the viewer near the camera, the results are clearly different.

An even further challenge is the retention of a high STE in circumstances in which both motion and defocus blur occur simultaneously.

In view of the shortcomings of the conventional approaches, a new method for providing improved sample test efficiency in image rendering is needed.

SUMMARY

A system, method, and computer program product for reducing the number of samples tested for rendering a screen space region of an image is presented herein. The method includes constructing a bilinear approximation per primitive for a screen space region which is to be rendered, the screen space region includes a plurality of sample points. The bilinear approximation is used to estimate coverage of a predefined primitive against one or more sample points within the screen space region. At least one sample point in the screen space region which is not covered by the predefined primitive is excluded from testing in the rendering of the screen space region.

The foregoing method finds particular application in the rendering of images, an exemplary method of which includes the aforementioned operations, and the additional operations of identifying a screen space region which is to be rendered, testing sample points which are located within the screen space region and which are potentially covered by the primitive (i.e., not excluded by bounds defined by the bilinear approximation), and rendering the screen space region based upon the tested sample points.

These and other features of the invention will be better understood in view of the following drawings and detailed description of exemplary embodiments.

BRIEF DESCRIPTION OF THE DRAWINGS

For clarity, previously described features retain their reference indices in subsequent figures.

DETAILED DESCRIPTION OF EXEMPLARY EMBODIMENTS

The present invention describes a system and method for reducing the number of samples tested for rendering a screen space region of an image. In accordance with the invention, combined time (t) and lens (u, v) bounds are calculated, so that even in the case of combined motion and defocus blur, the sample test efficiency remains high.

In accordance with the present invention, the dual-space concept described in the commonly-owned U.S. patent application Ser. No. 13/168,784 entitled "Clipless Time and Lens Bounds for Improved Sample Test Efficiency in Image Rendering" is extended into three dimensions.

Figure 1:
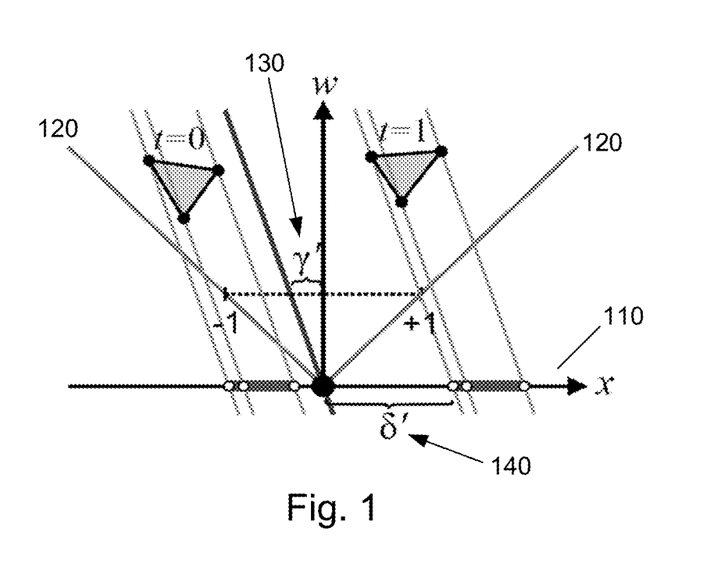
FIG. 1 illustrates a primitive at two time positions at t=0 and t=1 when viewed at a positional direction γ' in a camera space (x, w) in accordance with the present invention.

The construction is based on parallel projection of a vertex onto camera plane, illustrated in FIG. 1. FIG. 1 illustrates a (x, w) projection of the post-projective space, where the camera plane 110 is the x axis, and the frustum sides 120 are diagonal lines. The quantity γ 130 determines the parallel projection direction and is equivalent to screen-space position, and quantity δ 140 is the parallel projected position.

There are four bounds in total, minimum and maximum bounds for x and y, and each of these is handled separately. The maximum horizontal bound is discussed in the following description, and the remaining bounds are handled similarly.

Consider δ as a function in the (γ, u, t) space. For a single vertex, the function is given by:

$$\delta = x' - w'\gamma$$

where: $x' = (1-t)(x_0 + u\, c_0) + t(x_1 + u\, c_1)$, and
$w' = (1-t)(w_0) + t(w_1)$ Here, t is the time coordinate, u is the horizontal lens coordinate, $(x_0, w_0)$ and $(x_1, w_1)$ are vertex coordinates at t=0 and t=1, respectively, and $c_0$ and $c_1$ are post-projective-space circles of confusion at t=0 and t=1, respectively. Substitution and simplification shows that δ is a tri-linear function of (γ, u, t).

Consider the maximum horizontal bound for the triangle. For this bound, the criterion that the triangle may overlap a screen-space point γ with given (u, t) is that δ>0 for at least one vertex (for minimum horizontal bound the criterion would be the opposite). Therefore, to account for all three vertices of a triangle, the maximum δ of all vertices is taken before performing the comparison.

According to an exemplary method of the present invention in which the number of samples tested for rendering a screen space region of an image is reduced, in a first operation screen-space bounds are determined, for example, as described in the aforementioned U.S. patent application Ser. No. 13/168,784 "Clipless Time and Lens Bounds for Improved Sample Test Efficiency in Image Rendering." Further exemplary, a screen-space bounding rectangle is formed taking into account the circles of confusion of the vertices.

In order to handle geometry behind the camera plane, the bounding rectangle is extended to infinity on the sides where the 2D convex hull of the points contains the camera. A separate bounding box is not needed for minimum and maximum lens coordinates, only the overall screen-space scissor box.

Figure 2:
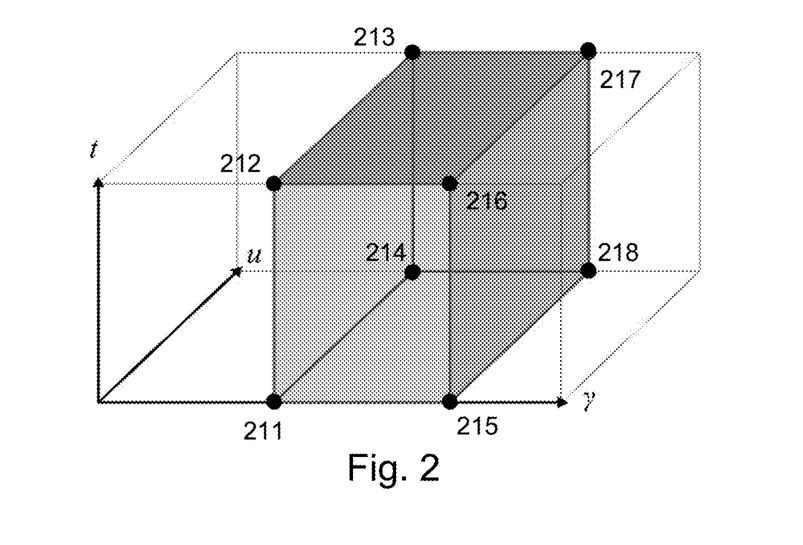
FIG. 2 illustrates a rectangular parallelepiped in (γ, u, t) space corresponding to the primitive shown in FIG. 1.

The screen-space bounds determine the γ ranges over which δ can be ascertained. Again considering the maximum horizontal bound, δ is evaluated in the eight corners of the parallelepiped in (γ, u, t) space that is spanned by the horizontal γ range (from the screen-space bounding box) and u and t ranges. FIG. 2 shows an exemplary parallelepiped in (γ, u, t) space having eight corners 211-218.

Figure 3:
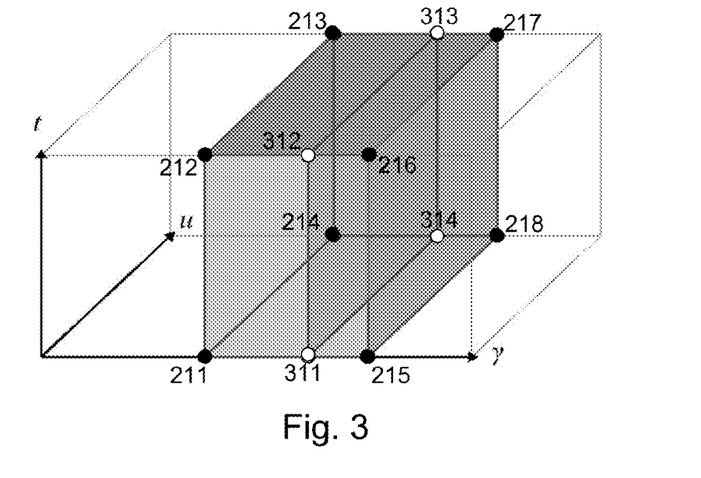
FIG. 3 illustrates the process of extracting a two dimensional function from the rectangular parallelepiped shown in FIG. 2.

Quantity δ is evaluated at the points 211-218 illustrated by the darkened dots. Even though δ is a maximum of three tri-linear functions (because of three vertices), it can still be approximated conservatively as a tri-linear function. Per screen-space region (e.g., pixel or tile), a slice of this three-dimensional function is extracted by linearly interpolating along the γ-oriented edges based on the screen-space region coordinate. FIG. 3 illustrates this operation.

Figure 4:
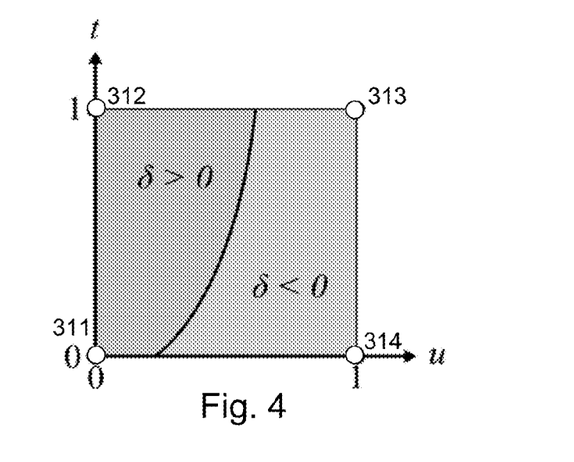
FIG. 4 illustrates a bilinear function which is the result of the extraction shown in FIG. 3.

The result is δ as a function of (u, t), defined by bilinear interpolation across a rectangle where the values in the corners 311-314 are known. The individual samples can now be tested against this function. For each sample in the screen-space region, δ is linearly interpolated from the corners 311-314 of the rectangle (bilerp) and tested against zero. To check minimum and maximum horizontal and vertical bounds, this operation is performed four times in total. FIG. 4 illustrates this operation.

In addition, because a screen-space region has nonzero screen extents, picking one γ at, e.g., its center, may not be representative for the entire region. When extracting a (u, t) slice, the minimum/maximum of δ is desired for the entire γ range spanned by the screen-space region, in order to guarantee that the slice is valid for all γ inside the region. Fortunately, because δ is taken to be linear along each axis, this can be arranged by adjusting the δ values evaluated at the corners depending on the derivative along the γ-oriented edges.

Figure 5:
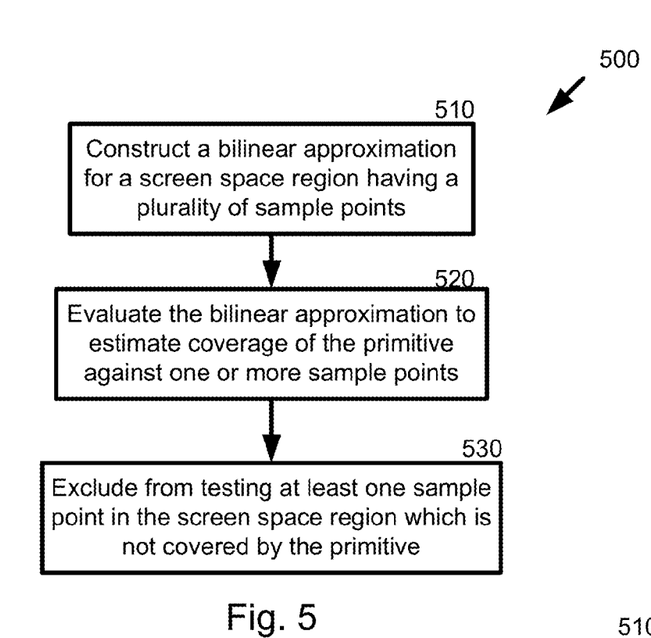
FIG. 5 illustrates a method for reducing the number of sample points tested for rendering a screen space region of an image in accordance with the present invention.

FIG. 5 illustrates a method for reducing the number of sample points tested for rendering a screen space region of an image in accordance with the present invention. At 510, a bilinear approximation is constructed for a screen space region which is to be rendered, wherein the screen space region includes a plurality of sample points. At 520, the bilinear approximation is used to estimate coverage of a predefined primitive against one or more sample points within the screen space region. At 530, at least one sample point which is included in the screen space region but which is not covered by the predefined primitive is excluded from testing when rendering the screen space region.

Exemplary of operation 510, the bilinear approximation is a function of time and lens position, as shown in FIG. 4. Further exemplary, the bilinear function identifies a region that is not covered by the primitive, exemplary, the region δ<0 shown in FIG. 4. Further exemplary, the bilinear approximation function defines a bound for the parallel projection position (δ) of the primitive to the camera plane (horizontal axis x in FIG. 1). In particular, the value of the bilinear approximation function defines the bound for the parallel projection position of the primitive.

Figure 6:
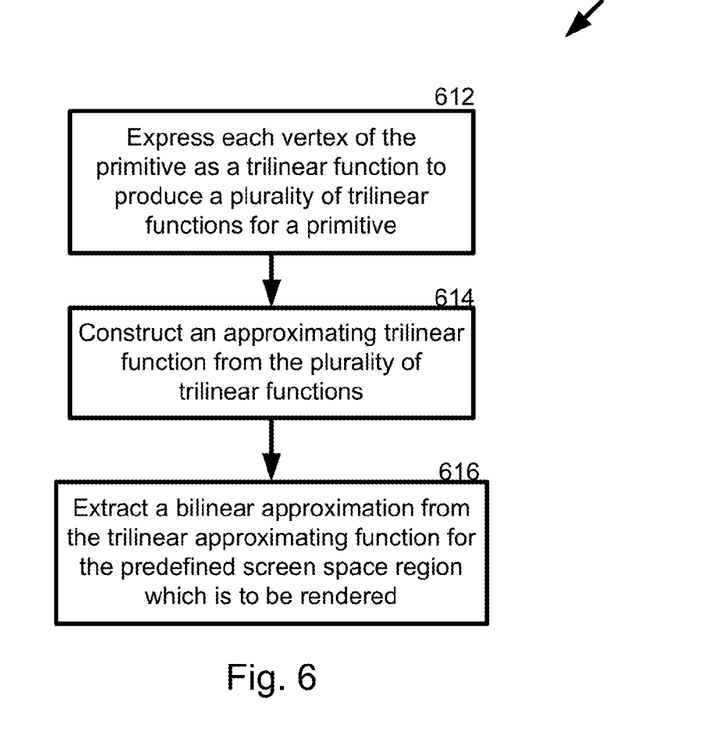
FIG. 6 illustrates an exemplary embodiment of an operation of FIG. 5, in which a bilinear approximation is constructed in accordance with the present invention.

FIG. 6 illustrates an exemplary embodiment of operation 510 of FIG. 5, in which a bilinear approximation is constructed. At 612, each vertex of the primitive is expressed as a tri-linear function, whereby a plurality of tri-linear functions are created corresponding to the primitive's plurality of vertices.

At 614, an approximating tri-linear function is constructed based upon the plurality of tri-linear functions, whereby the tri-linear approximating function bounds the tri-linear functions of the vertices. At 616, a bilinear approximation is constructed from the tri-linear approximating function for the predefined screen space region which is to be rendered.

Exemplary of operation 612, each vertex of the primitive is expressed as a function of a lens position (u) or (v), a projection direction γ along which the primitive is to be viewed, and time (t), as described above. Further particularly, each vertex of the primitive is expressed as a tri-linear function in the (γ, u, t) space or (γ, v, t) space, as described above.

Figure 7:
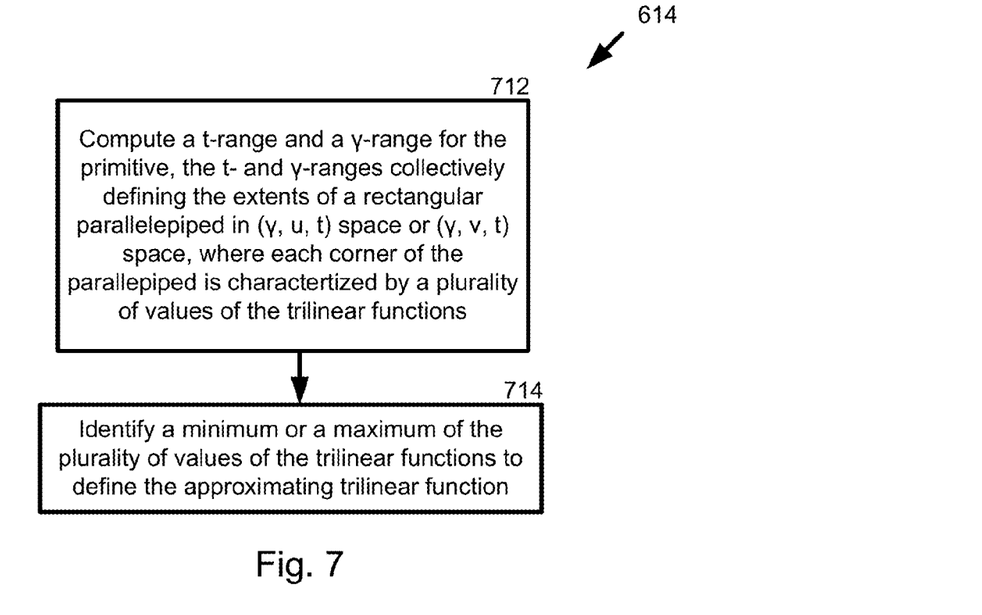
FIG. 7 illustrates an exemplary embodiment of an operation of FIG. 6, in which an approximating tri-linear function is constructed in accordance with the present invention.

FIG. 7 illustrates an exemplary embodiment of operation 614, in which an approximating tri-linear function is constructed using the multiple tri-linear functions corresponding to vertices of the primitive. At 712, a t-range and a γ-range for the primitive is computed, whereby the t-range and γ-range collectively define the extents of a rectangular parallelepiped in (γ, u, t) space or (γ, v, t) space, and further whereby each corner of the rectangular parallelepiped is characterized by a plurality of values of the tri-linear functions. An exemplary embodiment of this process is shown in FIG. 3 above.

At 714, a minimum or a maximum of the plurality of values of the tri-linear functions is identified to define the approximating tri-linear function. In one embodiment of operation 714, a maximum horizontal parallel projection position bound for the primitive is defined by a maximum of the plurality of values of tri-linear functions in (γ, u, t) space. In another embodiment of operation 714, a minimum horizontal parallel projection position bound for the primitive is defined by a minimum of the plurality of values of tri-linear functions in (γ, u, t) space. In a further embodiment of operation 714, a maximum vertical parallel projection position bound for the primitive is defined by a maximum of the plurality of values of tri-linear functions in (γ, v, t) space. In still a further embodiment of operation 714, a minimum vertical parallel projection position bound for the primitive is defined by a minimum of the plurality of values of tri-linear functions in (γ, v, t) space.

Further exemplary of operation 714, each of the tri-linear functions is expanded to extend over a line segment oriented along the γ-axis in the (γ, u, t) space or (γ, v, t) space which corresponds to the screen space region, so that evaluating the functions at one point within the segment yields bounds that are valid for every point within the segment.

Figure 8:
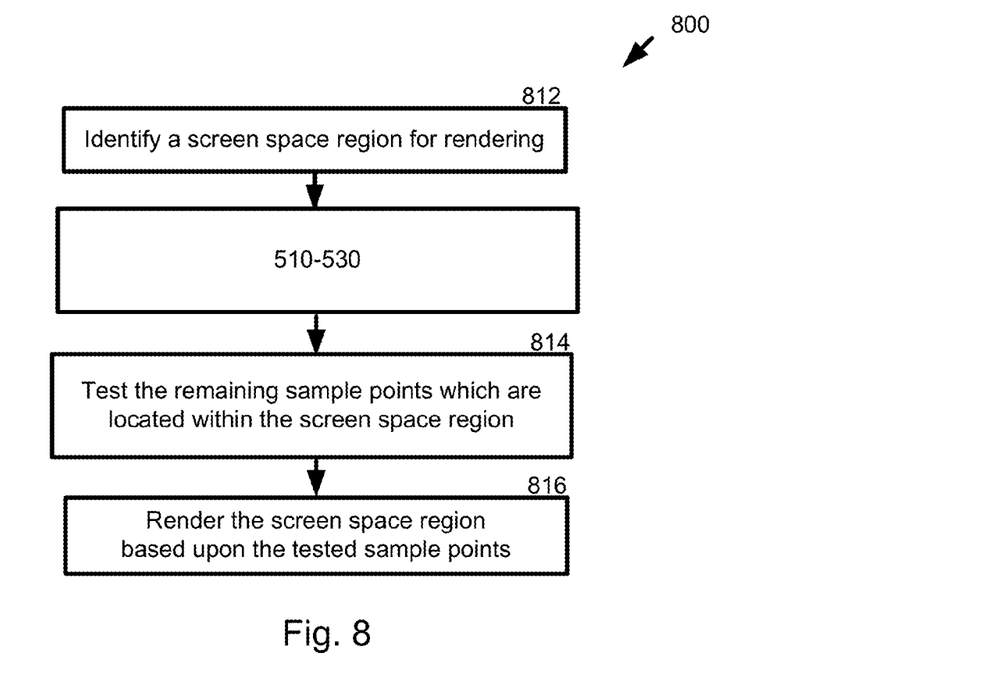
FIG. 8 illustrates an exemplary method for rendering a region of an image in accordance with the present invention.

FIG. 8 illustrates a method for rendering a region of an image which incorporates method 500. At 812, a screen space region which is to be rendered is identified. This process may be performed automatically during image rendering, as successive regions (e.g., pixels) of an image which is to be rendered are selected one after another, or it may occur manually, for example, if the viewer manually selects a region which is to be viewed. The method 800 continues with the implementation of operations 510, 520 and 530 as described, and implemented in accordance with one or more of the exemplary embodiments described herein. At 814, the remaining samples which are located within the screen space region (i.e., those samples which are not excluded in operation 530), are tested. At 816, the screen space region of the image is rendered based upon the tested samples. Exemplary embodiments of operation 816 include implementing a shader program operable to compute the color/transmittance/reflectance of the screen space region based upon the tested samples within that region and overlapped by the bounding volume. Further exemplary, the method 800 is repeated one or more times to render multiple regions of the image or the entire image. As used herein, the term "render" refers to the output of the screen space region/image in a visually comprehensible format (e.g., displayed on a monitor, printed on a medium, etc.), as well as the process of storing the data corresponding to such a region/image in electronic form, e.g. in a render target, such as a frame buffer.

Figure 9:
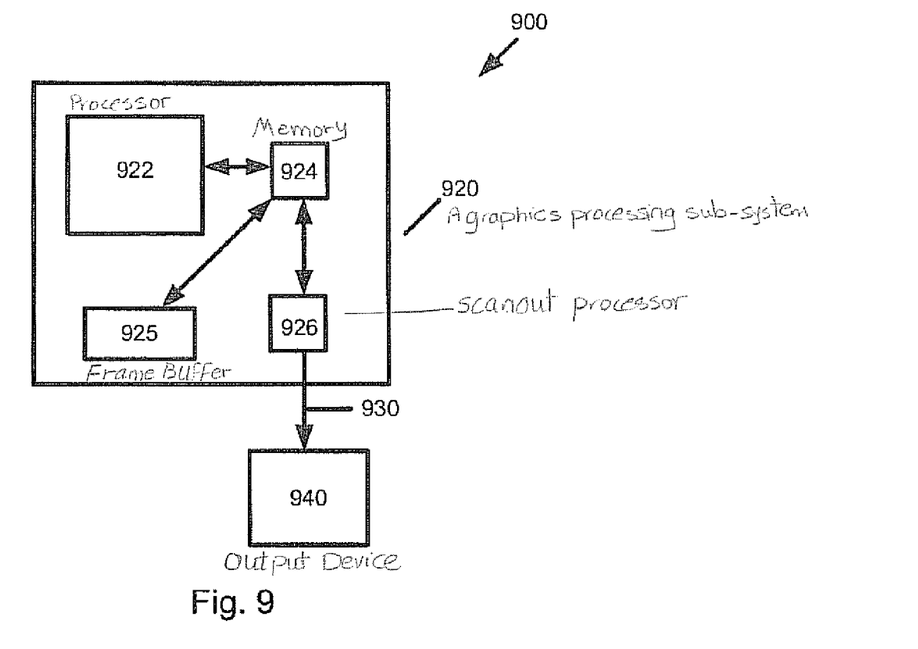
FIG. 9 illustrates an exemplary system in which the methods described for FIGS. 5-8 finds utility in accordance with the present invention.

FIG. 9 illustrates an exemplary system 900 in which the methods described for FIGS. 5-8 finds utility in accordance with the present invention. The system 900, exemplary a computer system, includes a graphics processing sub-system 920 and an output device 940, such as a monitor or printer.

The graphics processing sub-system 920 includes a processor 922, a memory interface 924, a frame buffer 925, and a scanout processor 926. The processor 922 is operable to perform any or all of the operations described for FIGS. 5-8 herein, and is a parallel processing architecture in an exemplary embodiment. A frame buffer 926 is operably coupled to the processor 922 for receiving rasterized and/or raytraced fragment values for each frame, and for reading out a composite image of each frame to the output device 940 via memory interface 924 and link 930 (e.g., a DVI link). In a specific embodiment, the processor 922 is operable to carry out one, several, or all of the operations described for any one, several or more of FIGS. 5-8. Further, the processor 922 may include local memory operable to store instruction code for performing the methods described in FIGS. 5-8. In an alternative embodiment, system 900 may take on different forms (e.g., a personal digital assistant, an internet device, a mobile telephone, or other mobile device), and processor 922 may be an embedded in such different systems. Further alternatively, the processor 922 may take the form of an application specific integrated circuit or other hardware/firmware circuit operable to carry out the operations described for any one, several, or all of FIGS. 5-8.

In one embodiment, system 900 is operable to reduce the number of samples tested for rendering a region of an image in accordance with the present invention. In this embodiment, the system 900 includes a processor 822 operable to perform one or more of the operations described for any one, several or all of FIGS. 5-8.

As readily appreciated by those skilled in the art, the described processes and operations may be implemented in hardware, software, firmware or a combination of these implementations as appropriate. In addition, some or all of the described processes and operations may be carried out as a computer-implemented method, or as computer readable instruction code resident on a computer readable medium, the instruction code operable to control a computer of other such programmable device to carry out the intended functions. An exemplary embodiment of such code (in the form of pseudocode) is provided in the attached appendix. The computer readable medium on which the instruction code resides may take various forms, for example, a removable disk, volatile or non-volatile memory, etc.

In a particular embodiment of the invention, a memory (which may be included locally within the processor 922 or globally within system 900) is operable to store instruction code ("instructions" for brevity) for performing any of the operations described for FIGS. 5-8. The memory may take various forms, e.g., a removable disk, an embedded memory, etc., in volatile or non-volatile form, and may be included within a variety of different systems, e.g. a computer system, an embedded processor, a graphics processor, or graphics processing sub-system, such as a graphics card.

Figure 10:
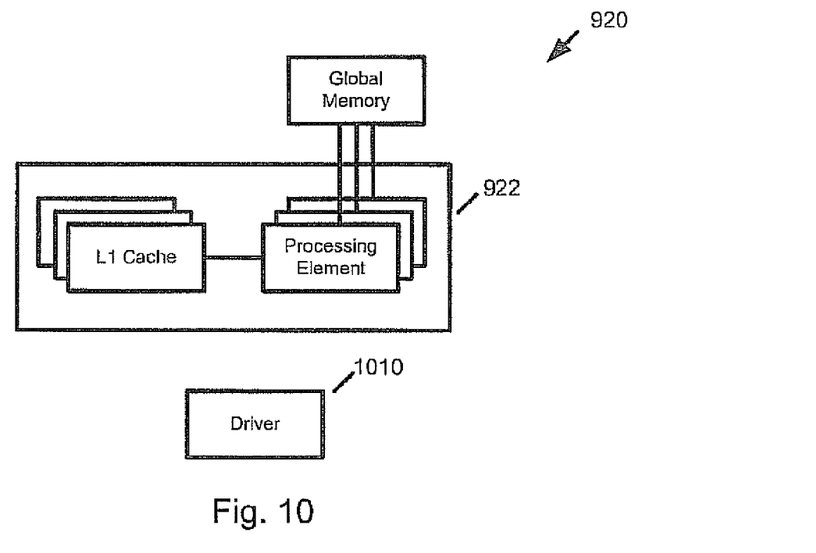
FIG. 10 illustrates an exemplary graphics processing subsystem shown in FIG. 9 in accordance with the present invention.

FIG. 10 illustrates an exemplary graphics processing sub-system 920 of FIG. 9 in accordance with the present invention. The graphics processing sub-system 920 includes parallel processing elements and their associated local L1 caches, as well as a global memory block which is operable to store instructions for carrying out the methods described for FIGS. 5-8. The sub-system 920 may further include one or more drivers 1010 for controlling the operation of the sub-system 920 in accordance with the methods described herein. In one embodiment, the sub-system 920 is included within in a graphics card. In another embodiment, the sub-system 920 is included within the motherboard of a computer or workstation or on a game console. In another embodiment, the sub-system 920 is realized in an embedded system, such as in a cellular telephone.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serves to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

The invention claimed is:

1. A method for reducing the number of sample points tested for rendering a screen space region of an image, the method comprising:
    (i) constructing, by a processor, a bilinear approximation per primitive for a screen space region which is to be rendered, wherein a primitive comprises a plurality of vertices, wherein each vertex is expressed as a function of lens position, projection direction, and time, and wherein the screen space region includes a plurality of sample points;
    (ii) evaluating the bilinear approximation to estimate coverage of a predefined primitive against one or more sample points in the screen space region; and
    (iii) excluding from testing at least one sample point in the screen space region which is not covered by the predefined primitive, wherein the bilinear approximation function identifies a region which is uncovered with respect to the predefined primitive.

2. The method of claim 1, wherein the bilinear approximation is a function of time and lens position.

3. The method of claim 1, wherein the bilinear approximation function defines a bound for the parallel projection position of the predefined primitive to a camera plane.

4. The method of claim 1, wherein the predefined primitive includes a plurality of vertices, and wherein (i) comprises:
    expressing each vertex as a tri-linear function, whereby a plurality of tri-linear functions are generated;
    constructing an approximating tri-linear function from the plurality of tri-linear functions, wherein the tri-linear approximating function bounds the tri-linear functions; and extracting a bilinear approximation from the tri-linear approximating function for the screen space region which is to be rendered.

5. The method of claim 4, wherein each tri-linear function is dependent upon a lens position (u) or (v), a projection direction γ along which the predefined primitive is to be viewed, and time (t).

6. The method of claim 5, wherein constructing an approximating tri-linear function comprises:
computing, for the predefined primitive, a t-range and a γ-range which collectively defines a plurality of extents/corner of a rectangular parallelepiped in (γ, u, t) space or (γ, v, t) space, wherein each extent/corner of the parallelepiped is characterized by a plurality of values of the tri-linear functions; and
identifying a minimum on a maximum of the plurality of values of the tri-linear functions to define the approximating tri-linear function.

7. The method of claim 6,
wherein a maximum horizontal parallel projection position hound for the predefined primitive is defined by the maximum of the plurality of values of tri-linear functions in (γ, u, t) space, or
wherein a minimum horizontal parallel projection position bound for the predefined primitive is defined by the minimum of the plurality of values of In-linear functions in (γ, u, t) space, or
wherein a maximum vertical parallel projection position bound for the predefined primitive is defined by the maximum of the plurality of values of tri-linear functions in (γ, v, t) space, or
wherein a minimum vertical parallel projection position bound for the predefined primitive is defined by the minimum of the plurality of values of tri-linear functions in (γ, v, t) space.

8. The method of claim 6, further comprising expanding each of the tri-linear functions to extend over a line segment oriented along the y-axis in the (γ, u, t) space or (γ, v, t) space which corresponds to the screen space region.

9. A method for rendering a screen space region of an image, comprising:
(i) identifying a screen space region of an image which is to be rendered;
(ii) constructing, by a processor, a bilinear approximation per primitive for a screen space region which is to be rendered, wherein a primitive comprises a plurality of vertices, wherein each vertex is expressed as a function of lens position, projection direction, and time, and
wherein the screen space region includes a plurality of sample points;
(iii) evaluating the bilinear approximation to estimate coverage of a predefined primitive against one or more sample points in the screen space region;
(iv) excluding from testing at least one sample point in the screen space region which is not covered by the predefined primitive, wherein the bilinear approximation function identifies a region which is outside of the predefined primitive;
(v) testing the remaining sample points which are located within the screen space region; and
(vi) rendering the screen space region of the image based upon the tested sample points.

10. The method of claim 9, wherein the primitive includes a plurality of vertices, and wherein (ii) comprises:
expressing each vertex as a tri-linear function, whereby a plurality of tri-linear functions are generated;
constructing an approximating tri-linear function from the plurality of tri-linear functions, wherein the tri-linear approximating function bounds the tri-linear functions; and
extracting a bilinear approximation from the tri-linear approximating function for the screen space region which is to be rendered.

11. The method of claim 10, wherein each tri-linear function is dependent upon a lens position (u) on (v), a projection direction y along which the primitive is to be viewed, and time (t).

12. The method of claim 11, wherein constructing an approximating tri-linear function comprises:
computing, for the primitive, a t-range and a y-range which collectively defines extents of a rectangular parallelepiped in (γ, u, t) space or (γ, v, t) space, wherein each corner of the parallelepiped is characterized by a plurality of values of the tri-linear functions; and
identifying a minimum or a maximum of the plurality of values of the tri-linear functions to define the approximating tri-linear function.

13. A system operable to reduce the number of sample points tested for rendering a screen space region of an image, the system including a processor operable to:
(i) construct a bilinear approximation per primitive for a screen space region which is to be rendered, wherein a primitive comprises a plurality of vertices, wherein each vertex is expressed as a function of lens position, projection direction, and time, and wherein the screen space region includes a plurality of sample points;
(ii) evaluate the bilinear approximation to estimate coverage of a predefined primitive against one or more sample points in the screen space region; and
(iii) exclude from testing at least one sample point in the screen space region which is not covered by the predefined primitive, wherein the bilinear approximation function identifies a region which is outside with respect to the predefined primitive.

14. The system of claim 13, wherein the bilinear approximation is a function of time and lens position.

15. The system of claim 13, wherein the primitive includes a plurality of vertices, and wherein the processor operation (i) includes the operations of:
expressing each vertex as a tri-linear function, whereby a plurality of tri-linear functions are generated;
constructing an approximating tri-linear function from the plurality of tri-linear functions, wherein the tri-linear approximating function bounds the tri-linear functions; and
extracting a bilinear approximation from the tri-linear approximating function for the screen space region which is to be rendered.

16. The system of claim 15, wherein each tri-linear function is dependent upon a lens position (u) or (v), a projection direction y along which the predefined primitive is to be viewed, and time (t).

17. The system of claim 16, wherein the processor operations for constructing an approximating tri-linear function comprises:
computing, for the predefined primitive, a t-range and a γ-range which collectively defines a plurality of extents/corner of a rectangular parallelepiped in (γ, u, t) space or (γ, v, t) space, wherein each extent/corner of the parallelepiped is characterized by a plurality of values of the tri-linear functions; and identifying a minimum or a maximum of the plurality of values of the tri-linear functions to define the approximating tri-linear function.

18. A system operable to render a screen space region of an image, the system including a processor operable to:
  (i) identify a screen space region of an image which is to be rendered;
  (ii) construct a bilinear approximation per primitive for a screen space region which is to be rendered, wherein a primitive comprises a plurality of vertices, wherein each vertex is expressed as a function of lens position, projection direction, and time, and wherein the screen space region includes a plurality of sample points;
  (iii) evaluate the bilinear approximation to estimate coverage of a predefined primitive against one or more sample points in the screen space region; and
  (iv) exclude from testing at least one sample point in the screen space region which is not covered by the predefined primitive, wherein the bilinear approximation function identifies a region which is not covered by the predefined primitive
  (v) test the remaining sample points which are located within the screen space region; and (vi) render the screen space region of the image based upon the tested sample points.

19. The system of claim 18; wherein the predefined primitive includes a plurality of vertices, and wherein the processor operation (ii) includes the operations of:
  expressing each vertex as a tri-linear function, whereby a plurality of tri-linear functions are generated;
  constructing an approximating tri-linear function from the plurality of tri-linear functions, wherein the tri-linear approximating function bounds the tri-linear functions; and
  extracting a bilinear approximation from the tri-linear approximating function for the screen space region which is to be rendered.

20. The system of claim 19, wherein each tri-linear function is dependent upon a lens position (u) or (v), a projection direction along which the predefined primitive is to be viewed, and time (t).

21. The system of claim 20, wherein the processor operation of constructing an approximating tri-linear function comprises the processor operations of:
  computing, for the predefined primitive, a t-range and a γ-range which collectively defines extents of a rectangular parallelepiped in (γ, u, t) space or (γ, v, t) space, wherein each corner of the parallelepiped is characterized by a plurality of values of the tri-linear functions; and
  identifying a minimum or a maximum of the plurality of values of the tri-linear functions to define the approximating tri-linear function.

22. A non-transitory computer readable medium having stored thereon a computer program product which is executable by a computer, and operable to store executable instructions for reducing the number of sample points tested for rendering a screen space region of an image, the computer program product comprising:
  (i) instruction code for constructing a bilinear approximation pen primitive for a screen space region which is to be rendered, wherein a primitive comprises a plurality of vertices, wherein each vertex is expressed as a function of lens position, projection direction, and time, and wherein the screen space region includes a plurality of sample points;
  (ii) instruction code for evaluating the bilinear approximation to estimate coverage of a predefined primitive against one on more sample points in the screen space region; and
  (iii) instruction code for excluding from testing at least one sample point in the screen space region which is not covered by the predefined primitive, wherein the bilinear approximation function identifies a region which is uncovered by the predefined primitive.

23. The computer program product of claim 22, wherein the predefined primitive includes a plurality of vertices, and wherein instruction code (i) comprises:
  instruction code for expressing each vertex as a tri-linear function, whereby a plurality of tri-linear functions are generated;
  instruction code for constructing an approximating tri-linear function from the plurality of tri-linear functions, wherein the tri-linear approximating function bounds the tri-linear functions; and
  instruction code for extracting a bilinear approximation from the tri-linear approximating function for the screen space region which is to be rendered.

24. The computer program product of claim 23, wherein each tri-linear function is dependent upon a lens position (u) on (v), a projection direction y along which the predefined primitive is to be viewed, and time (t), and wherein the instruction code for constructing an approximating tri-linear function comprises:
  instruction code for computing, for the predefined primitive, a t-range and a γ-range which collectively defines a plurality of extents/corner of a rectangular parallelepiped in (γ, u, t) space or (γ, v, t) space, wherein each extent/corner of the parallelepiped is characterized by a plurality of values of the tri-linear functions; and
  instruction code for identifying a minimum or a maximum of the plurality of values of the tri-linear functions to define the approximating tri-linear function.

25. A non-transitory computer readable medium having stored thereon a computer program product which is executable by a computer, and operable to store executable instructions for rendering a screen space region of an image, the computer program product comprising:
  (i) instruction code for identifying a screen space region of an image which is to be rendered;
  (ii) instruction code for constructing a bilinear approximation per primitive for a screen space region which is to be rendered, wherein a primitive comprises a plurality of vertices, wherein each vertex is expressed as a function of lens position, projection direction, and time, and wherein the screen space region includes a plurality of sample points;
  (iii) instruction code for evaluating the bilinear approximation to estimate coverage of a predefined primitive against one or more sample points in the screen space region;
  (iv) instruction code for excluding from testing at least one sample point in the screen space region which is not covered by the predefined primitive, wherein the bilinear approximation function identifies a region which is not covered by the predefined primitive;
  (v) instruction code for testing the remaining sample points which are located within the screen space region; and
  (vi) instruction code for rendering the screen space region of the image based upon the tested sample points.

26. The computer program product of claim 25, wherein the predefined primitive includes a plurality of vertices, and wherein instruction code (ii) comprises:

instruction code for expressing each vertex as a tri-linear function, whereby a plurality of tri-linear functions are generated;

instruction code for constructing an approximating tri-linear I unction from the plurality of tri-linear functions, wherein the tri-linear approximating function hounds the tri-linear functions; and instruction code for extracting a bilinear approximation from the tri-linear approximating function for the screen space region which is to be rendered.

27. The computer program product of claim 26, wherein each tri-linear function is dependent upon a lens position (u) on (v), a projection direction γ along which the predefined primitive is to be viewed, and time (t), and wherein the instruction code for constructing an approximating tri-linear function comprises:

instruction code for computing, for the predefined primitive, a t-range and a γ range which collectively defines a plurality of extents/corner of a rectangular parallelepiped in (γ, u, t) space or (γ, v, t) space, wherein each extent/corner of the parallelepiped is characterized by a plurality of values of the tri-linear functions; and instruction code for identifying a minimum on a maximum of the plurality of values of the tri-linear functions to define the approximating tri-linear function.

* * * * *